United States Patent [19]

Buehler et al.

[11] Patent Number: 5,346,936
[45] Date of Patent: Sep. 13, 1994

[54] STARCH/POLYMER MIXTURE, PROCESS FOR THE PREPARATION THEREOF, AND PRODUCTS OBTAINABLE THEREFROM

[75] Inventors: Friedrich S. Buehler, Thusis; Eduard Schmid, Bonaduz; Hans-Joachim Schultze, Chur, all of Switzerland

[73] Assignee: EMS-Inventa AG, Switzerland

[21] Appl. No.: 898,132

[22] Filed: Jun. 15, 1992

[30] Foreign Application Priority Data

Jun. 17, 1991 [DE] Fed. Rep. of Germany ....... 4119915

[51] Int. Cl.$^5$ ............... C08L 3/04; C08L 101/00; C08K 5/21; C08K 5/05
[52] U.S. Cl. ............................ 524/47; 524/50; 524/51; 524/52
[58] Field of Search ................ 524/47, 50, 51, 52

[56] References Cited

U.S. PATENT DOCUMENTS

| | | | |
|---|---|---|---|
| 4,673,438 | 6/1987 | Wittwer et al. | 106/126 |
| 4,983,651 | 1/1991 | Griffin | 524/47 |
| 5,094,054 | 3/1992 | Lay et al. | 524/47 |
| 5,108,807 | 4/1992 | Tucker | 524/47 |

FOREIGN PATENT DOCUMENTS

| | | |
|---|---|---|
| 0118240 | 9/1984 | European Pat. Off. . |
| 0327505 | 8/1989 | European Pat. Off. . |
| 0409781 | 1/1991 | European Pat. Off. . |
| 0409782 | 1/1991 | European Pat. Off. . |
| 14938 | 12/1990 | PCT Int'l Appl. . |
| 2214918 | 9/1989 | United Kingdom . |

*Primary Examiner*—Nathan M. Nutter
*Attorney, Agent, or Firm*—Jordan B. Bierman

[57] ABSTRACT

A biodegradable, single-phase starch/polymer mixture comprising
(a) 10 to 99 parts of a starch molding composition comprising
  (i) 95 to 45 parts of at least one chemically modified starch, and
  (ii) 5 to 55 parts of at least one emulsifier, plasticizer or destructurizing agent, the parts of (i) and (ii) adding up to 100; and
(b) 90 to 1 parts of at least one linear polymer, the parts by weight of components (a) and (b) adding up to 100. In addition, 0 to 20 parts of additives which are customary in this area are included. A method of preparation, and the use thereof for thermoplastically molded parts, in particular films, is also disclosed.

27 Claims, No Drawings

STARCH/POLYMER MIXTURE, PROCESS FOR THE PREPARATION THEREOF, AND PRODUCTS OBTAINABLE THEREFROM

This application claims the priority of German Application P 41 19 915, filed Jun. 17, 1991.

The invention relates to a biodegradable and single-phase starch/polymer mixture comprising a selected linear polymer and a starch molding composition. Preferably, it is prepared from chemically modified starch, plasticizer, emulsifier, and urea or derivatives thereof. A process for the preparation of this single-phase starch/polymer mixture is also disclosed. Still further, the invention is directed to thermoplastically molded parts, in particular films, produced from the mixture by injection molding, extrusion, coextrusion, blow molding, injection stamping, and thermoforming, and the like.

BACKGROUND OF THE INVENTION

Since starch is a vegetable carbohydrate, efforts are being made to use it as a "natural plastic" in a wide variety of areas using existing methods of processing plastics. Due to their granular structure, however, natural starches must first be broken down or destructurized, before they become thermoplastically processable. Although they are biodegradable and have then the characteristics of thermoplastic plastics, the starches do not have their desired good properties. In order to achieve these properties, thermoplastic starch compositions of this type must be further improved. However, this frequently causes them to lose their full biodegradability.

EP 344 118 A2 relates to a polymer blend material comprising a melt of at least one water-containing destructurized hydrophilic polymer and at least one synthetic, essentially water-insoluble thermoplastic polymer. Examples are blends based on gelatin and cellulose derivatives, and polyethylene, polystyrene, polyvinyl ether, polyoxymethylene, and ethylene-acrylic acid copolymers which show an improvement in dimensional stability resulting from the addition of the water-insoluble polymer. However, the reference made therein to a possible biodegradability, namely the loss of this additional stability after several days, is instead something of a disadvantage for products molded from the blends, without actually saying anything regarding biodegradability itself.

EP-A 327 505 A2 describes a melt-mixed polymer blend material comprising destructurized, - but chemically unmodified-starch and at least one water-insoluble, synthetic thermoplastic polymer.

In the same way, EP-A 409 789 A2, EP-A 409 788 A2, EP-A 409 783 A2, EP-A 409 782 A2, EP-A 409 781 A2, EP-A 408 503 A2, EP-A 408 502 A2, EP-A 408 501 A2, EP-A 407 350 A2, EP-A 404 728 A2, EP-A 404 723 A2, and EP-A 404 727 A2 disclose polymer blend compositions comprising destructurized, but chemically unmodified, starch and a functionalized polymer. Each of these compositions may additionally contain a water-insoluble, thermoplastic polymer. The functionalized polymer then acts as a compatibility enhancer between the chemically unmodified starch and the additional third thermoplastic polymer.

SUMMARY OF THE PRESENT INVENTION

The object of the present invention is to provide a biodegradable, single-phase (compatible) starch/polymer mixture for thermoplastic processing which contains no polymeric compatibility promoters, and a process for the preparation of this mixture. The mixture should also have a long shelf life in granular form; i.e., it should be resistant to moisture, and suitable for the production of thermoplastically molded parts, in particular highly extensible, weldable films which are resistant to cold water. Such mixtures should have a particular application in the production of coextrusion films with further polymers the without the addition of a primer.

Surprisingly, it has been found that a single-phase starch/polymer mixture for thermoplastic processing can be prepared without polymeric compatibility promoters if (1) the starch employed is chemically modified and contains certain additives, and (2) the polymer employed is a linear polymer preferably having a melting or softening point of 50° to 160° C. All parts and percentages referred to in the specification and claims are by weight.

DETAILED DESCRIPTION OF THE INVENTION

The biodegradable, single-phase starch/polymer mixture according to the invention comprises
(a) from 10 to 99 parts of a starch molding composition comprising
  (i) 95 to 45 parts of a chemically modified starch, and
  (ii) 5 to 55 parts of plasticizers and/or destructurizing agents, the parts of (i) and (ii) adding up to 100; and
(b) 90 to 1 parts of at least one linear polymer,
the parts of components (a) and (b) adding up to 100. Up to 20 parts of customary additives may also be included. The chemically modified starch to be employed according to the invention should have a natural water content of from 5% to 16%.

The preferred chemically modified starch according to the invention is prepared by a special process described in U.S. application Ser. No. 890,563, filed Nov. 6, 1992, incorporated herein by reference. In this process, 95 to 53.2 parts of chemically modified starch are destructurized with 4.8 to 39.8 parts of at least one plasticizer, 0.1 to parts of urea and/or urea derivatives, and 0.1 to 2 parts of at least one emulsifier at elevated temperatures and pressures in an extruder. The mixture is extruded as a melt.

The preferred chemically modified starch has a natural water content of 5% to 16%, preferably 6% to 12%, most preferably from 6 to 8%. In general, the final water content of the starch/polymer mixture is 2% to 8%, preferably 2% to 5%. The preferred starch has been modified by reaction of its OH groups with alkylene oxides or other substances which form ethers, esters, urethanes, carbamates, and/or isocyanates. Particular preference is given to hydroxy alkyl having 2 to 6 carbon atoms, acetyl, and carbamate starches or mixtures thereof.

The degree of substitution of the desirable chemically modified starch is 0.01 to 0.2, and the amylose content is 20% to 100%, preferably 50% to 100%, especially 65% to 100%.

The plasticizers of (a)(ii) are organic compounds containing at least one hydroxyl group, preferably a polyol. Particularly preferable are glycerol, sorbitol, mannitol, D-glucose, ethylene glycol, polyethylene glycol, propylene glycol, and mixtures thereof. They are usefully employed in amounts of 4.8 to 39.8 parts, preferably 9.8 to 39.8 parts, most preferably 15 to 30 parts. The urea and/or urea derivatives of (a)(ii) are advantageously added in amounts of 0.1 to 5 parts, preferably from 0.1 to 2 parts, most preferably about 2 parts.

The emulsifier desirably has a hydrophilic-lipophilic balance value (HLB) of 0 to 20, preferably 10 to 20; and is employed in amounts of 0.1 to 2 parts, preferably 0.1 to 2 parts, especially about 0.2 parts, per 100 parts of component (a). Suitable emulsifiers are metal stearates, glycerol monostearates, polyoxyethylene (20) sorbitan monolaurate, polyoxyethylenemonopalmitate, polyoxyethylene (40) stearate, polyoxyethylene (100) stearate, and mixtures thereof.

In a preferred embodiment, component (a) comprises 70 parts of hydroxyethyl- and/or hydroxypropylstarch, having a degree of substitution of 0.06 and an amylose content of 50%, 15 parts of glycerol, 12.8 parts of sorbitol, 2 parts of urea, and 0.2 parts of magnesium stearate.

Component (b) is at least one linear polymer having a melting or softening point of 50° to 160° C., preferably 60° to 150° C. Particularly suitable are polyamides and/or polyesters. From the polyamide class, preference is given to homopolyamides and/or copolyamides made from ώ-aminocaproic acid, ώ-aminoenanthic acid, ώ-aminocaprylic acid, ω-aminopelargonic acid, ω-aminocapric acid, ώ-aminoundecanoic acid, 107-aminolauric acid, caprolactam, lactam-7, lactam-8, lactam-9, lactam-10, lactam-11, and/or laurolactam. Particularly preferred are those polyamides made from caprolactam, laurolactam, ώaminolauric acid, and/or ώaminocaproic acid.

Suitable polyamides can also be made, for example, from dimethylenediamine, trimethylenediamine, tetramethylenediamine, pentamethylenediamine, hexamethylenediamine, polyetherdiamine, and mixtures thereof, on the one hand; and oxalic acid, malonic acid, succinic acid, glutaric acid, adipic acid, pimelic acid, suberic acid, azelaic acid, sebacic acid, nonanedicarboxylic acid, decanedicarboxylic acid, undecanedioic acid, dodecanedioic acid, dimerised fatty acids, and mixtures thereof, on the other hand. Of particular value are hexamethylenediamine, polyetherdiamine, adipic acid, dimerised fatty acids, and mixtures thereof.

From the class of the polyesters, preference is given to homopolyesters and/or copolyesters made from ω-hydroxyacetic acid, ω-hydroxypropionic acid, ω-hydroxybutyric acid, ω-hydroxyvaleric acid, ω-hydroxycaproic acid, ω-hydroxyenanthic acid, ω-hydroxycaprylic acid, ω-hydroxypelargonic acid, ω-hydroxycapric acid, ω-hydroxyundecanoic acid, ω-hydroxylauric acid, caprolactone, lactone-7, lactone-8, lactone-9, lactone-10, lactone-11, and/or laurolactone.

Also useful for this purpose are ethylene glycol, propanediol, butanediol, pentanediol, hexanediol, an aliphatic diol mixture having 2 to 18 carbon atoms, on the one hand; and oxalic acid, malonic acid, succinic acid, glutaric acid, adipic acid, pimelic acid, suberic acid, azelaic acid, sebacic acid, nonanedicarboxylic acid, decanedicarboxylic acid, undecanedioic acid, dodecanedioic acid, terephthalic acid, isophthalic acid, anhydrides and/or chlorides of the foregoing, and/or esters thereof.

Particularly preferred as sources of polyesters are aliphatic diol mixtures having 2 to 18 carbon atoms, ω-hydroxycaproic acid, butane-1,4-diol, adipic acid, terephthalic acid, isophthalic acid, and mixtures thereof. Homopolyesters and/or copolyesters made from aliphatic dicarboxylic acids having 2 to 12 carbon atoms and aliphatic diols having 2 to 6 carbon atoms are especially suitable. In practice, the above-mentioned copolyamides and copolyesters or mixtures thereof have proven particularly successful as component (b), it being possible to replace some or all of these by the above-mentioned homopolymers.

Customary additives are optical brighteners, stabilizers, antioxidants, flameproofing agents, dyes, fillers, and processing aids; one or more of these can additionally be employed in amounts of from 0 to 20 parts per 100 parts of the starch/polymer mixture.

In a preferred embodiment, the inventive mixture contains 50 to 95 parts of component (a) and 50 to 5 parts of component (b). Most preferably, 70 to 80 parts of component (a) and 30 to 20 parts of component (b) are used.

The process for the preparation of the single-phase starch/polymer mixture according to the invention comprises jointly melting components (a) and (b) in a ratio of from 10:90 to 99:1 in an extruder or in an injection-molding machine at temperatures at least 10° C. below the decomposition point of the starch and a maximum of 30° C., preferably 20° C., above the melting or softening point of the polymer. By adjusting the processing temperature, an optimum ratio between the viscosity of the polymer and the viscosity of the starch (the latter can be modified only slightly by temperature variations) can be determined by means of simple preliminary experiments, it being possible to homogeneously mix the melts by applying strong shear forces to the components. The customary additives may either be metered in during the preparation of the starch/polymer mixture or, preferably, are previously added to components (a) and/or (b).

The starch/polymer mixture according to the invention can be used for the production of thermoplastically molded parts, it being preferred first to produce a granulate which is then employed for the production of moldings. These can be formed, for example, by injection molding, blow molding, extrusion, coextrusion, injection stamping, or thermoforming. Particular preference is given here to the production of films by monoextrusion or coextrusion; these films may be formed as flat or blown films.

Advantages of the starch/polymer mixture according to the invention are:

1. Single-phase without addition of a polymeric compatibility promoter/compatibilizer.
2. Surprising biodegradability of the polymer component.
3. Good tear strength and elongation at break.
4. Ability to be converted to storage-stable granulate due to the low tendency to absorb moisture.
5. Simple processing without any tendency toward blocking and without any tack problems to produce films.

In the production of coextruded films from the inventive single-phase starch/polymer mixture and further polymers, the latter should have a melting or softening point of 50° to 180° C. Polymers which are suitable for this purpose are copolyamides, copolyesters, and/or polyolefins. Preference is given here to polyolefins selected from polyethylene, polypropylene, polybutylene, and their derivatives. Particular preference is given to polyethylene and/or its derivatives.

In a specific embodiment, the single-phase starch/polymer mixture forms the middle layer, and the further polymer(s) form the inner and outer layers of the coextruded film. If the film has more than three layers, the layers thus alternate, the outer layer being selected on the basis of the desired application for the film. All films can be produced in a thickness of from 20 to 500 μm, preferably from 50 to 100 μm.

Advantages of the films according to the invention are:
1. Good adhesion of the coextruded film layers without addition of a primer
2. The film layer made from the starch/polymer mixture has, in the dry state, a barrier action against $O_2$, $N_2$, and $CO_2$
3. Biodegradability of the monofilms
4. Improved moisture resistance
5. Low-temperature stretchability of the monofilms
6. High extensibility of the monofilms, in some cases greater than 400%
7. Welding possible using conventional heat-sealing equipment, fully transparent seal welds being obtained for monofilms.
8. Antistatic behavior of monofilms
9. Printing of monofilms with water-soluble inks
10. Paper-like hand of the monofilms in the highly stretched state
11. Smooth surfaces of the monofilms.

The monofilms are suitable, for example, for the production of carrier bags, refuse sacks, agricultural sheeting, diaper outer films, and biodegradable sheeting and film of all types. In addition, all films can be subjected to a thermoplastic forming process, such as deep drawing (thermoforming).

Table 1 shows the parameters for the preparation of single-phase starch/polymer mixtures and Table 2 shows the properties thereof. Table 3 shows the extrusion parameters and the properties of the monofilms and coextruded films.

FIG. 1 shows the Differential Scanning Calorimetry (DSC) curves for the starch/polymer mixtures of Examples 2 to 5. These show that only one melting point exists in each case, which proves that the starch/polymer mixtures according to the invention have a single phase.

The following examples illustrate the invention but do not limit it.

EXAMPLE 1

Preparation of the biodegradable starch molding composition

Component (a)

A starch molding composition is prepared by the process described in U.S. application Ser. No. 890,563, filed Nov. 6, 1992 from 70 parts of hydroxypropyl maize starch (having a degree of substitution of 0.06 and an amylose content of 50%), 15 parts of glycerol, 12.8 parts of sorbitol, 2 parts of urea, and 0.2 parts of magnesium stearate. The composition is subsequently granulated.

EXAMPLES 2 to 19

Preparation of the biodegradable, single-phase starch molding mixture

The starch granulate of Example 1 is mixed with granulate of the linear polymer of component (b) and the mixture is metered into the metering zone of a ZSK-30 twin-screw extruder (Werner & Pfleiderer) having 6 heating zones. The rotational speed and throughput are 100 rpm and 8–10 kg/h, respectively. The polymer type, polymer melting point, proportion by weight of the polymer, extrusion temperatures, and granulate properties are shown in Table 1. The material properties of the resultant single-phase starch/polymer mixtures are shown in Table 2.

The final water contents of the single-phase starch/polymer mixtures are determined by the method of Karl Fischer in accordance with DIN 53 714, and the melting point is determined by DSC in the dry state at a heating rate of 20° C./min in a Du Pont thermal analyzer type 1091B. The melt viscosity is measured by the melt flow index method at 160° C. and a load of 236.4N. The mechanical properties are determined on injection-molded test bars in accordance with DIN 53 457 (modulus of elasticity in tension) and DIN 53 455 (tear strength and elongation at break).

In experiments to determine the biodegradability it was observed, surprisingly, that the single phase starch/polymer-mixture according to the invention and the blown films produced therefrom have a more rapid oxygen consumption than the pure polymer (component (b) of the starch-polymer-mixture). It is well known that linear polyesters or polyamides are predestined for biological decomposition as, structurally, they are closely related to peptides. The actual resistance is caused by their unfavorable wetability with water in which the decomposition bacteria are contained. A possible explanation for this surprising effect is that the starch component greatly increases the otherwise low wetability of the polymer with water and in addition synergistic effects occur.

Comparative Examples 7 and 9 to 12 show that, if the three temperature conditions, namely (1) the melting point of the polymer of between 50° to 160° C., (2) the processing temperature of a maximum of 30° C. above the melting point of the polymer, and (3) the processing temperature at least 10° C. below the decomposition point of the starch, are not observed, a brown coloration results. The decomposition point of the preferred modified starch is 190° C.

EXAMPLES 20 to 22

Production of coextruded films

A three-extruder coextrusion unit according to the prior art is used to produce three-layer blown films from the granulated single-phase starch/polymer mixture and Lucalen (BASF). Extruder 1 produces the Lucalen inner layer, extruder 2 produces the middle layer of the single-phase starch/polymer mixture, and extruder 3 produces the Lucalen outer layer. The extrusion parameters and the properties of the films are shown in Table 3. Although no primer is added, the individual film layers adhere to one another very well.

EXAMPLES 23 to 27

Production of monofilms

On the same extrusion unit as in Examples 20 to 22, but with only one extruder, blown films are produced from the granulated single-phase starch/polymer mixture. The extrusion parameters and the properties of the films are shown in Table 3.

The commercial products used in the Examples are:

Lucalen A-2920 M—an ethylene copolymer from BASF having a melting point of 97° C.
Grilon CF 62 BSE—a copolyamide based on the monomers PA 6 and PA 6.9 from EMS-Chemie having a melting point of 136° C.
Grilon CR 9—a copolyamide based on the monomers PA 6 and PA 12 from EMS-Chemie having a melting point of 200° C.
Grilon CA 6E—a copolyamide based on the monomers PA 6 and PA 12 from EMS-Chemie having a melting point of 130° C.
Grilamid ELY 60—a copolyamide from EMS-Chemie based on lactam-12, polyetherdiamine, and dimerized fatty acid, and having a melting point of 160° C.
Griltex 6—a copolyester from EMS-Chemie based on terephthalic acid, isophthalic acid, and butanediol, and having a melting point of 128° C.
Griltex 8—a copolyester from EMS-Chemie based on terephthalic acid, isophthalic acid, and butanediol, and having a melting point of 115° C.
Griltex 9—a copolyester from EMS-Chemie based on terephthalic acid, isophthalic acid, and an aliphatic diol mixture, and having a melting point of 118° C.

TABLE 1

Single-phase starch/polymer mixtures

| | Polymer | | Proportion | Extruder | | | | | | | | |
|---|---|---|---|---|---|---|---|---|---|---|---|---|
| Example | Type | m.p. (°C.) | (parts by weight) | $T_1$ (°C.) | $T_2$ (°C.) | $T_3$ (°C.) | $T_4$ (°C.) | $T_5$ (°C.) | $T_6$ (°C.) | $T_{melt}$** (°C.) | Granulate color | Granulatability |
| 2a + 2 | Grilon CF 62 BSE | 136 | 50 | 0 | 140 | 145 | 145 | 145 | 150 | 167 | very good | yes |
| 3 | Grilon CF 62 BSE | 136 | 40 | 0 | 140 | 145 | 145 | 145 | 150 | 163 | very good | yes |
| 4 | Grilon CF 62 BSE | 136 | 30 | 0 | 140 | 145 | 145 | 145 | 150 | 161 | very good | yes |
| 5 | Grilon CF 62 BSE | 136 | 20 | 0 | 140 | 145 | 145 | 145 | 150 | 157 | very good | yes |
| 6 | Grilon CF 62 BSE | 136 | 10 | 0 | 140 | 145 | 145 | 145 | 150 | 165 | very good | yes |
| 7* | Grilon CR 9 | 200 | 50 | 0 | 210 | 230 | 230 | 230 | 240 | 235 | brown/burnt | no |
| 8 | Grilon CA 6E | 130 | 50 | 0 | 140 | 140 | 140 | 140 | 150 | 165 | good | yes |
| 9* | Grilamid ELY 60 | 160 | 50 | 0 | 150 | 170 | 150 | 150 | 170 | 179 | strong brown coloration | yes |
| 10* | Grilamid ELY 60 | 160 | 30 | 0 | 150 | 170 | 150 | 150 | 170 | 180 | strong brown coloration | yes |
| 11* | Grilamid ELY 60 | 160 | 10 | 0 | 150 | 170 | 150 | 150 | 170 | 178 | strong brown coloration | yes |
| 12* | Grilamid ELY 60 | 160 | 5 | 0 | 150 | 170 | 150 | 150 | 170 | 179 | strong brown coloration | yes |
| 17 | Griltex 6 | 128 | 50 | 0 | 150 | 130 | 130 | 130 | 150 | 151 | very good | yes |
| 18 | Griltex 8 | 115 | 50 | 0 | 150 | 150 | 130 | 130 | 150 | 151 | very good | yes |
| 19 | Griltex 9 | 118 | 50 | 0 | 150 | 150 | 130 | 130 | 150 | 150 | very good | yes |

**$T_{melt}$ = Temperature of the melt
*Comparative examples

TABLE 2

Material properties

| Example | Water[1] (% by weight) | m.p.[2] (°C.) | Melt viscosity[3] (pa · s) | Modulus of elasticity[4] (N/mm$^2$) | Tear strength[5] (N/mm$^2$) | Elongation at break[6] (%) | Swelling in cold water (%) | Dissolution in hot water |
|---|---|---|---|---|---|---|---|---|
| 2a | 11.6 | — | 259 | 78 | 10.5 | 434 | max. 10 | yes |
| 2 | 4.4 | 107 | 1867 | 254 | 21.1 | 404 | max. 10 | yes |
| 3 | 2.2 | 111 | 4508 | 299 | 17.5 | 221 | max. 10 | yes |
| 4 | 1.8 | 114.5 | 6500 | 1038 | 26.6 | 4 | max. 10 | yes |
| 5 | 1.6 | 113 | 8000 | 1393 | 30.4 | 3 | max. 10 | yes |
| 6 | — | — | — | — | — | — | dissolves | yes |
| 17 | 4.7 | — | 148 | 564 | 16.0 | 564 | | |
| 18 | 7.4 | — | 72 | 5 | 10.0 | 556 | | |
| 19 | 4.1 | — | 136 | 22 | 15.0 | 590 | | |

[1]Final water content in accordance with DIN 53 714
[2]Melting point by DSC
[3]Melt viscosity at 160° C. and 236.4 N
[4]Modulus of (elasticity) in tension in accordance with DIN 53 457
[5,6]In accordance with DIN 53 455

TABLE 3

Production of blown films

| Example | Extr. 1[1] | Extr. 2[2] Mixture from ex. | Extr. 3[3] | $T^4$ (°C.) | Thickness[5] (μm) | Appearance | Running properties/ surface quality | Extensibility[6] (%) |
|---|---|---|---|---|---|---|---|---|
| 23 | — | 2 | — | 160 | 120 | turbid/transp. | good/few exudation marks, rough surface | 400 |
| 20 | Lucalen | 2 | Lucalen | 160 | 50 | turbid/transp. | good/few exudation marks | 400 |
| 24 | — | 3 | — | 140 | 80 | turbid/transp. | good/no exudation marks smooth surface | 220 |
| 25 | — | 4 | — | 144 | 50 | trubid/transp. | very good/very uniform | 4 |
| 21 | Lucalen | 4 | Lucalen | 135 | 50 | turbid/transp. | very good/very uniform | 4 |
| 26 | — | 5 | — | 135 | 50 | turbid/transp. | very good/very uniform | 3 |
| 22 | Lucalen | 5 | Lucalen | 135 | 50 | turbid/transp. | very good/very uniform | 3 |

TABLE 3-continued

| | | Extr. 2[2] Mixture | | | Production of blown films | | | |
|---|---|---|---|---|---|---|---|---|
| Example | Extr. 1[1] | from ex. | Extr. 3[3] | T[4] (°C.) | Thickness[5] (μm) | Appearance | Running properties/ surface quality | Extensibility[6] (%) |
| 27 | — | 6 | — | 155 | 100 | turbid/transp. | good/surface structure | 3 |

[1-3]Extruders 1 to 3 of the coextrusion unit
[4]Head temperature in the blown film unit
[5]Film thickness
[6]Stress/strain experiment

What is claimed is:

1. A biodegradable, single-phase starch/polymer mixture comprising
   (a) 10 to 99 parts by weight of a starch molding composition comprising
      (i) 95 to 45 parts by weight of at least one chemically modified starch,
      (ii) 0.1 to 5 parts by weight of urea, urea derivatives, or mixtures thereof,
      (iii) 4.9 to 50 parts of at least one plasticizer, the parts of (i), (ii), and (iii) adding up to 100, and
   (b) 90 to 1 parts by weight of at least one linear polymer other than ethylene copolymers, the parts of components (a) and (b) adding up to 100.

2. The starch/polymer mixture of claim 1 wherein there are 0 to 20 parts by weight of additives present.

3. The starch/polymer mixture of claim 2 wherein said additives are selected from the group consisting of optical brighteners, stabilizers, antioxidants, dyes, fillers, flameproofing agents, processing aids, and mixtures thereof.

4. The starch/polymer mixture of claim 1 wherein (a) comprises 0.1 to 2.0 parts by weight of at least one emulsifier.

5. The starch/polymer mixture of claim 1 wherein (a) comprises
   (i) 95 to 53.2 parts by weight of at least one chemically modified starch,
   (ii) 4.8 to 39.8 parts by weight of at least one plasticizer,
   (iii) 0.1 to 5 parts by weight of urea, urea derivatives, or mixtures thereof, and
   (iv) 0.1 to 2 parts by weight of at least one emulsifier, the parts of (i), (ii), (iii), and (iv) adding up to 100.

6. The starch/polymer mixture of claim 5 wherein (a) contains urea, urea derivatives, and mixtures thereof, in an amount of 0.1% to 2%.

7. The starch/polymer mixture of claim 1 wherein said chemically modified starch has a natural water content of 5% to 16%.

8. The starch/polymer mixture of claim 1 wherein said chemically modified starch has been modified by reaction of its OH groups with at least one compound selected from the group consisting of alkylene oxides and other substances which form ethers, esters, urethanes, carbamates or isocyanates and mixtures thereof.

9. The starch/polymer mixture of claim 8 wherein said amylose content is 20% to 100%.

10. The starch/polymer mixture of claim 1 wherein said chemically modified starch is a hydroxy-alkyl, acetyl, carbamate starch, or mixtures thereof, said alkyl having 2 to 6 carbon atoms.

11. The starch/polymer mixture of claim 1 wherein said chemically modified starch has a degree of substitution of 0.01 to 0.2.

12. The starch/polymer mixture of claim 1 wherein said plasticizer is an organic compound containing at least one hydroxyl group.

13. The starch/polymer mixture of claim 12 wherein said organic compound is selected from the group consisting of sorbitol, mannitol, D-glucose, glycerol, ethylene glycol, polyethylene glycol, propylene glycol, and mixtures thereof.

14. The starch/polymer mixture of claim 1 wherein said emulsifier has an HLB value of 0 to 20.

15. The starch/polymer mixture of claim 14 wherein said emulsifier is selected from the group consisting of metal stearates, glycerol monostearates, polyoxyethylene (20) sorbitan monolaurate, polyoxyethylene (20) sorbitan monopalmitate, polyoxyethylene (40) stearate, polyoxyethylene (100) stearate, and mixtures thereof.

16. The starch/polymer mixture of claim 1 wherein (b) has a melting or softening point of 50° to 160° C.

17. The mixture of claim 16 wherein said linear polymer is selected from the group consisting of homopolyamides, copolymides, and mixtures thereof, said homopolyamides being made from a compound selected from the group consisting of ω-aminocarboxylic acid and lactams having 6 to 12 carbon atoms;
   said copolyamides being made from ωaminocarboxylic acids, lactams having 6 to 12 carbon atoms, and mixtures thereof.

18. The mixture of claim 16 wherein said linear polymer is selected from the group consisting of homopolyamides, copolyamides, and mixtures thereof, said homopolyamides being made from aliphatic diamines having 2 to 6 carbon atoms or polyetherdiamines reacted with linear dicarboxylic acids having 2 to 12 carbon atoms or dimerized fatty acids;
   said copolyamides being reaction products of compounds selected from the group consisting of aliphatic diamines having 2 to 6 carbon atoms, polyetherdiamines, and mixtures thereof with compounds selected from the group consisting of linear dicarboxylic acids having 2 to 12 carbon atoms, dimerized fatty acids, and mixtures thereof.

19. The mixture of claim 16 wherein said linear polymer is selected from the group consisting of homopolyesters, copolyesters, and mixtures thereof, said homopolyesters being made from a compound selected from the group consisting of ω-hydroxycarboxylic acids having 2 to 12 carbon atoms and lactones having 6 to 12 carbon atoms;
   said copolyester being a reaction product of compounds selected from the group consisting of ω-hydroxycarboxylic acids having 2 to 12 carbon atoms, lactones having 6 to 12 carbon atoms, and mixtures thereof.

20. The mixture of claim 15 wherein said linear polymer is selected from the group consisting of homopolyesters, copolyesters, and mixtures thereof, said homopolyesters being made from a first alcohol and a first acid, said first alcohol being selected from the group consisting of aliphatic diols having 2 to 6 carbon atoms, said first acid being selected from the group consisting of linear dicarboxylic acids having 2 to 12 carbon atoms, terephthalic acid, and isophthalic acid;

said copolyesters being made from second alcohols and second acids, said second alcohols being selected from the group consisting of aliphatic diols having 2 to 6 diols, an aliphatic diol mixture having 2 to 18 carbon atoms, and mixtures thereof, said second acid being selected from the group consisting of linear dicarboxylic acids having 2 to 12 carbon atoms, terephthalic acid, isophthalic acid, and mixtures thereof.

21. A process for the preparation of the starch/polymer mixture of claim 1 wherein (a) and (b) are premixed in a ratio of from 10:90 to 99:1, (a) and (b) being homogeneously mixed in a melt at temperatures of at least 10° C. below the decomposition point of said starch and a maximum of 30° C. above the melting or softening point of the said linear polymer, and said mixture is extruded or coextruded.

22. Thermoplastically molded parts produced from the starch/polymer mixture of claim 1 by injection molding, extrusion, coextrusion, blow molding, thermoforming, or injection stamping.

23. The molded parts of claim 22 which are films comprising 50 to 95 parts of (a) and 50 to 5 parts of (b).

24. The molded parts of claim 22 which are coextruded films comprising at least one further polymer having a melting or softening point of 50° to 180° C.

25. The molded parts of claim 24 wherein said further polymer is selected from the group consisting of copolyamides, copolyesters, polyolefins, and mixtures thereof.

26. The molded parts of claim 25 wherein said polyolefin are selected from the group consisting of polyethylene/polypropylene, polybutylene, and derivatives and mixtures thereof.

27. The molded parts of claim 24 wherein said coextruded films comprise a middle layer of said starch/polymer mixture, and an upper layer and a lower layer of said further polymer.

* * * * *